US008204095B2

(12) United States Patent
Kong et al.

(10) Patent No.: US 8,204,095 B2
(45) Date of Patent: Jun. 19, 2012

(54) RAPID ACQUISITION METHOD FOR IMPULSE ULTRA-WIDEBAND SIGNALS

(75) Inventors: Xiangming Kong, Thousand Oaks, CA (US); Mohiuddin Ahmed, Moorpark, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 401 days.

(21) Appl. No.: 12/624,537

(22) Filed: Nov. 24, 2009

(65) Prior Publication Data
US 2011/0122924 A1  May 26, 2011

(51) Int. Cl.
H04B 1/00 (2006.01)
(52) U.S. Cl. .......................... 375/130
(58) Field of Classification Search ............... 375/138, 375/239, 316, 340, 343, 354; 370/213; 329/313
See application file for complete search history.

(56) References Cited

U.S. PATENT DOCUMENTS

| 7,342,972 B1* | 3/2008 | Giannakis et al. ............ 375/259 |
| 7,505,516 B2* | 3/2009 | Gargin ............................ 375/238 |
| 7,787,516 B2* | 8/2010 | Kim et al. ....................... 375/131 |
| 2009/0110128 A1* | 4/2009 | Yu et al. ......................... 375/354 |

OTHER PUBLICATIONS

Benoit Miscopein et al., Low Complexity Synchronization Algorithm for Non-Coherent UWB-IR Receivers, France Telecom, 2007, pp. 2344-2348.
Sandeep R. Aedudodla et al., Timing Acquisition in Ultra-Wideband Communication Systems, IEEE Transactions on Vehicular Technology, vol. 54, No. 5, Sep. 2005, pp. 1570-1583.
Eric A. Homier et al., Rapid Acquisition of Ultra-Wideband Signals in the Dense Multipath Channel, IEEE Conference on Ultra Wideband Systems and Technologies, 2002, pp. 105-110.
Sian Gezici et al., A Rapid Acquisition Technique for Impulse Radio, MERL—A Mitsubishi Electric Research Laboratory, TR-2003-46, Aug. 2003.
H. Bahramgiri et al., Multiple-Shift Acquisition Algorithm in Ultra-Wide Bandwidth Frame Time-Hopping Wireless CDMA Systems, 2002.
Luca Reggiani et al., A Reduced-Complexity Acquisition Algorithm for UWB Impulse Radio, 2003, pp. 131-135.
Honglei Zhang, et al., Rapid Acquisition of Ultra-Wideband Radio Signals, 2002, pp. 71-716.
Zhi Tian, et al., Symbol Timing Estimation in Ultra Wideband Communications, 2002, pp. 1924-1928.
Saravanan Vijayakumaran et al., On Equal-Gain Combining for Acquisition of Time-Hopping Ultra-Wideband Signals, IEEE Transactions on Communication, vol. 54, No. 3, Mar. 2006, pp. 479-490.
R. Jean-Marc Cramer, et al., Evaluation of an Ultra-Wide-Band Propagation Channel, IEEE Transactions on Antennas and Propagation, vol. 50, No. 5, May 2002, pp. 561-570.
Andreas F. Molisch, et al., IEEE 802.15.4a channel model—final report, pp. 1-41.
Rodney G. Vaughan et al., Super-Resolution of Pulsed Multipath Channels for Delay Spread Characterization, IEEE Transactions on Communications, vol. 47, No. 3, Mar. 1999, pp. 343-347.
Oscar Moreno, et al., Transactions Letters, IEEE Transactions on Communications, vol. 48, No. 8, Aug. 2000, pp. 1241-1244.

* cited by examiner

Primary Examiner — Khanh C Tran

(57) ABSTRACT

A method is provided that determines a delay and phase of an ultra-wide band signal in a communication system using a single correlator. A pulse search is executed that includes correlating a signal template with a UWB signal and sampling a preamble of the UWB signal at various time positions until a pulse in the signal template matches a pulse in the preamble. A chip boundary at which the pulse in the preamble is detected is identified using the signal template. A code search is executed for determining the correct phase of the received signal. The code search utilizes a plurality of phases having a same time-hopping sequence as the received signal. Each pulse of the phases is positioned at the determined chip boundary within each respective chip pulse position. Chips pulse positions of the phases are compared with the chip pulse positions of the UWB signal for determining a phase match.

20 Claims, 6 Drawing Sheets

| Chip Pos. | 3 | 5 | 8 | 11 | 13 | 16 | 19 | 21 | 24 |
|---|---|---|---|---|---|---|---|---|---|
| Phase j | 1 | 14 | 9, 22 | 1, 9 | 14, 22 | 1, 14 | 9 | 22 | 1, 9, 14, 22 |

Fig. 8c

RAPID ACQUISITION METHOD FOR IMPULSE ULTRA-WIDEBAND SIGNALS

BACKGROUND OF INVENTION

An embodiment relates generally to ultra-wideband signals broadcast in a signal.

Sensing devices such as in-vehicle sensing devices involve the sensing of a vehicle operation or similar and the transfer of data obtained by the sensing device to a processing device. The transfer of a data can be a wireline or a wireless communication. Wireline communications, such as a communication bus, add cost due to physical hardware coupling the sensors to the processing devices. Wireless communications eliminate some of the hardware associated with wireline communications; however, an issue with wireless communications is the potential interference with other wireless signals.

The use of ultra-wide band (UWB) communications is advantageous in communication systems since UWB signals is spread over a wide spectral density, and therefore is robust to interference with other wireless signals. In UWB communication, the technique uses extremely narrow RF pulses to communicate between the transmitter and receiver. Using short pulses in cooperation with a time-hopping sequence occurs at such a fast rate that is extremely difficult to intercept and resists jamming. Using short pulses permits the signal to be generated using a very wide bandwidth which allows coexistence and minimal interference with other wireless signals transmitted in the vehicle.

The issue with using the UWB communications is that the signal is spread out over a large bandwidth and the time required to synchronize and acquire the correct phase of the signal may be too long if only using a single correlator. A parallel acquisition technique can be used; however, each correlator used adds hardware complexity and cost to the system.

SUMMARY OF INVENTION

An advantage of an embodiment of the invention is the rapid acquisition of an impulse ultra-wideband signal by applying a fine tuning search to detect the channel delay so that a chip boundary of the received signal is located, and then a code search is executed for finding correct phase of the spreading sequence in less time than a traditional serial search.

An embodiment contemplates a method of determining a delay and phase of a received ultra-wide band signal in a communication system. An ultra-wideband (UWB) signal is received from a transmitting device. A signal template is compared to at least one frame in a preamble of the received UWB signal. The signal template includes a series of continuous pulses wherein each pulse is equivalent to an amplitude and duration of a pulse in the preamble of the USB signal. The preamble is sampled at various time positions using the signal template until a pulse in the signal template matches a pulse in the preamble. A chip boundary is identified within a chip position at which the pulse is detected. A plurality of phases are provided having a time-hopping sequence of the UWB signal. Each of the pulses in the plurality of phases is positioned within respective chip positions at the chip boundary. A chip position of a first pulse is identified in the received signal. The phases that have a pulse at the chip position identified above are identified. The identified phases are compared with the UWB signal. The comparison between each phase and the UWB signal is initiated at a next chip position following the chip position identified above. A chip position for each pulse of each phase is recorded and compared to the pulse chip positions of the UWB signal. The phase having a maximum number of pulse chip positions that directly correlate to the pulse chip positions of the UWB signal is selected for synchronization to process the remainder of the UWB signal.

An embodiment contemplates a method determining a delay and phase of an ultra-wide band signal in a communication system; (a) an ultra-wideband (UWB) signal is received from a transmitting device; (b) a pulse search is executed that includes correlating a signal template with the UWB signal and sampling a preamble of the UWB signal at various time positions until a pulse in the signal template matches a pulse in the preamble; (c) a chip boundary at which the pulse in the preamble is detected is identified using the signal template during the pulse search; (d) a code search for identifying a phase of a time-hopping sequence of the UWB signal is identified where the code search provides a plurality of phases having a same time-hopping sequence as the UWB signal, each of the plurality of phases having initial starting positions that are different than one another, each of the pulses in the plurality of phases are positioned within respective chip positions at the chip boundary as determined in step (c); (e) a chip position of a first pulse in the received signal detected after the initiation of the code search is identified; (f) the phases having a pulse at the chip position identified in step (e) are identified; and (g) the phases identified in step (f) are compared with the UWB signal for determining a phase match, the comparison between each phase and the UWB signal is initiated at a next chip position that follows the chip position identified in step (f), the phase that matches the UWB signal is selected for synchronization for processing the remainder of the UWB signal.

BRIEF DESCRIPTION OF DRAWINGS

FIG. 8a is a table illustrating potential phases of the transmitted UWB signal.

FIG. 8b is a table of the candidate phases of the UWB signal.

FIG. 8c illustrates a chip position table.

DETAILED DESCRIPTION

Figure 1:
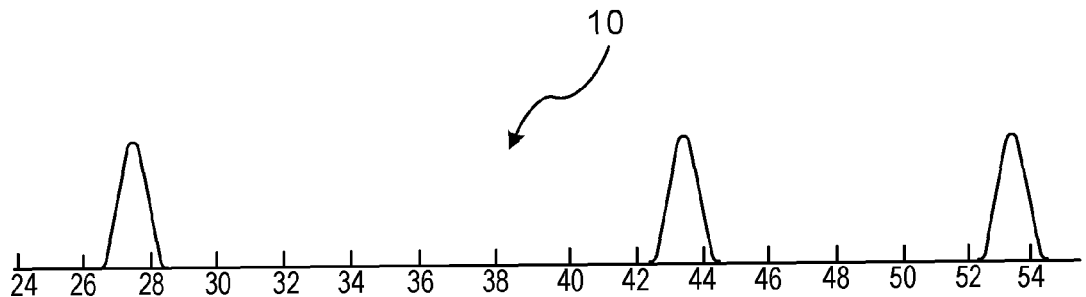
FIG. 1 is an example of a transmitted UWB signal.

Impulse ultra-wideband (UWB) signals utilize extremely narrow RF pulses to communicate between transmitters and receivers. The UWB techniques spread the signal energy over a large bandwidth resulting in a low power spectral density. Since UWB signals produce very small interference to existing narrowband signals, UWB signals are exceptional for use in communications such as, but not limited to, intra-vehicle sensor communications, which provides the advantages of large throughput, robustness to jamming, and the coexistence with other RF communications in a vehicle. However, the narrowness of a pulse and the low duty cycle of the pulse period impose stringent requirements on timing accuracy and synchronization at the receiver. The narrowness of the pulse results in a large search space making timing acquisition a very challenging process. Long spreading sequences used in typical UWB systems for channelization and spectral smoothing further complicate the acquisition process since the search space is largely increased.

The acquisition process as described herein is divided into two stages. The first stage includes determining a delay of a pulse within a chip (i.e., delay search). The second stage includes determining a phase of the spreading sequence (i.e., code search). In the preferred embodiment, a coherent energy detection scheme is used which is less sensitive to noise. Maximum correlation with a signal template occurs when the delay of the template matches a delay of a channel so that the transmitter and the receiver are synchronized. Typical timing acquisition techniques include either a serial search, which employs the use of a single correlator, or a parallel search which employs the use of a plurality of correlators.

Serial acquisition techniques check the candidate phases serially until a correlation of a respective phase passes a threshold. The issue with prior art techniques that use serial acquisition techniques is that the serial search scheme requires a long duration of time to complete the acquisition process. In addition, the process has to finish within a time period of the preamble period for a transmitted data packet. Therefore, long acquisition times are unacceptable.

Parallel techniques allow for faster searching since the searches are performed in parallel; however, correlators are expensive so the additional cost to utilize a plurality of correlators is undesirable from a cost standpoint.

For serial search techniques, various existing techniques are known to either perform a delay search by focusing only on the problem of finding the delay while not employing a spreading sequence or performing a code search and assuming that the channel delay is just a multiple of the chip duration. If a combination of the two techniques are used such as performing a code search first (i.e., coarse search) and then a delay search (i.e., fine tuning search), then the effective length of the spreading sequence would be reduced; however, in such a system with rich multi-path signals, the false alarm rate in the coarse search could be extremely high. Even if coarse search resulted in many false alarms, some of the fine tuning search steps would result in a longer search times.

The following paragraphs describe the basics of a system model employed by the preferred embodiment.

FIG. 1 illustrates a UWB signal 10 transmitted in a UWB communication system. The UWB transmitted signal 10 is amplitude modulated. A time hopping sequence is applied to the transmitted UWB signal. Time-hopping involves a spread spectrum technique in which pulses are transmitted in a manner that is determined by a pseudorandom code. A respective pulse is placed in one of several chip positions in a frame.

Figure 2:
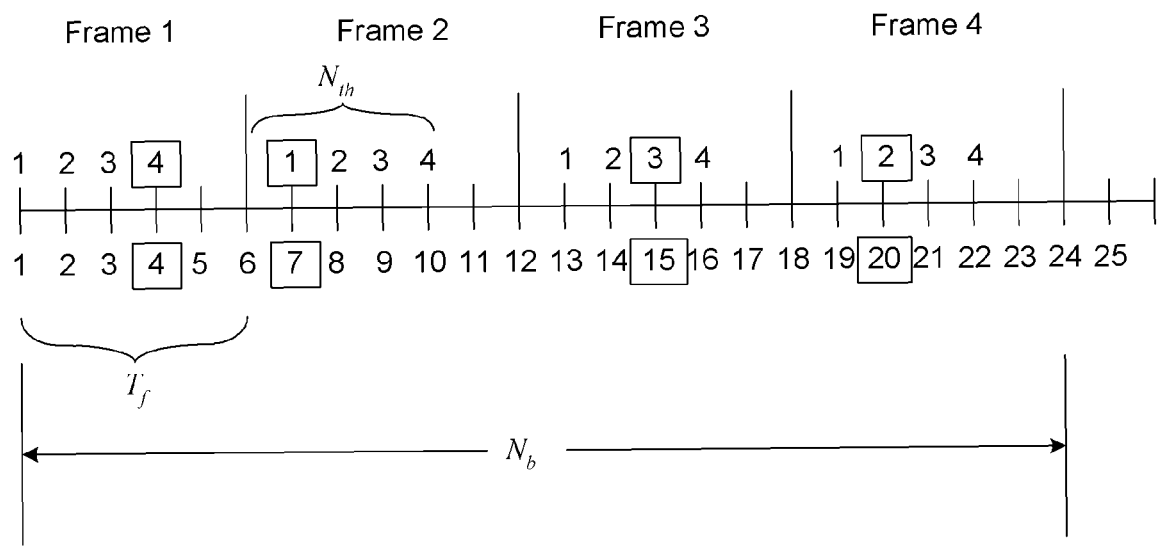
FIG. 2 illustrates timeline for a spreading sequence within a signal.

FIG. 2 illustrates the spreading of data within each of the frames. In FIG. 2, each frame has a duration of $T_f$ that is equal to $N_f$ chips. In this example, a bit is $N_b$ frames long, and each frame is made up of 6 chips in length; however, there are only 4 chip positions $N_{th}$ in which the pulse can be located within a frame. The remaining two chip positions are delays. Therefore, if a signal has a time-hopping sequence of 4, 1, 3, 2, then a pulse exists in each frame at the respective chip positions in the frame according to the time-hopping sequence. The overall chip position is identified by a chip count that expands continuously over the entire bit. In the example shown in FIG. 2, the pulses have overall chip positions at 4, 7, 15, and 20.

The signal transmitted in FIG. 1 can be represented by the following formula:

$$s(t) = \sum_i b_{\lfloor i/N_b \rfloor} p(t - iT_f - c_{\lfloor i/N_{th} \rfloor} T_c)$$

where p(t) is the pulse function, $N_{th}$ is the length of all the frames, $T_c$ is the chip duration, $c_{\lfloor i/N_{th} \rfloor}$ is the pseudo random time hopping sequence, $T_f$ is the frame duration, and $N_b$ is the number of frames per bit.

Timing acquisition for the delay search must be completed during the preamble period. It is assumed that the transmitted signal can arrive at a receiver from L different paths, which are referred to as a multi-path reception. Therefore, a channel response from each path will be slightly different; however, this difference is ignored in the technique disclosed herein. The channel is represented by a tapped delay line in the following equation:

$$h(t) = \sum_{l=1}^{L} a_l \delta(t - \tau_l)$$

where $a_l$ and $\tau_l$ are path gain and delay of $l^{th}$ path respectively, $\delta(t)$ is the Dirac Delta function, and t is the time. In the search algorithm described herein, the delay of the signal template is increased by a fraction of the chip duration $T_c$. In this manner, the matching of the pulse to the signal template does not overshoot the pulse during the search. The search resolution $\Delta\tau=T_c/M$ is determined by the system requirement and is preset where M is an integer number. In this way, a channel delay can be expressed as $\tau_l=nT_c+m\Delta\tau$, where m and n (m<M) are both non-negative integers. It is also assumed that only one sensor transmits at a time for simplicity purposes, although the technique still works in multiple access scenarios as long as the TH sequence has proper cross-correlation properties.

The received signal at the receiver is represented by the following equation:

$$r(t) = \sum_{l=1}^{L} a_l s(t - \tau_l)$$

where s is the transmitted signal.

In a traditional acquisition approach, the signal template is a delayed version of the transmitted pulses represented by the following equation:

$$g(t, \tau) = \sum_{i=1}^{N_{th}} p(t - iT_f - c_{\lfloor i/N_{th} \rfloor} T_c - \tau)$$

Due to the cyclic nature of the transmitted signal, the search resolution $\tau < N_{th} T_f$ is assumed. The correlation between this template and the received signal is represented by the equation:

$$R(\tau) = \int_0^{N_{th} T_f} r(t) g(t, \tau) dt.$$

Since the search resolution is $\Delta\tau$, then $$\tau = nT_f + m\Delta\tau, \; n=0, \ldots, N_{th}-1, \; m=0, \ldots, MN_f-1$$

Once $R(\tau)$ is larger than a threshold, which occurs when $\tau$ matches $\tau_1$, which represents the delay of one strong multipath, then the acquisition period ends. If $\tau$ is increased sequentially by $\Delta\tau$, then the total search time will be $MN_{th}^2 N_f T_f$ to complete all possible phases. This will be very large for typical UWB systems where $N_f$ and $N_{th}$ are both large.

To maintain a single correlator structure as used in a serial search, the following synchronization technique is utilized which obtains the results faster than the basic system model described above. The restriction is removed that the channel delay is a multiple of the chip intervals. A rapid acquisition technique is employed that searches the channel delay to a fraction of one chip duration and a rapid acquisition for searching the phase of the spreading sequence. Once the delay search is completed, then the correct phase can be found very quickly in both spare and dense multi-path environments while maintaining hardware simplicity and robustness against noise.

Figure 3:
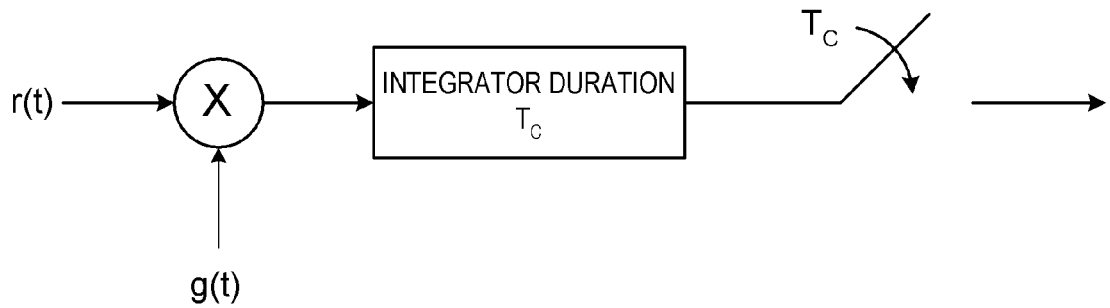
FIG. 3 illustrates a block diagram of a correlator

FIG. 3 illustrates a base block diagram of a correlator between the received signal and a signal template. In contrast to correlators used in known serial search schemes, the correlation result is sampled at every $T_c$ interval.

Figure 4:
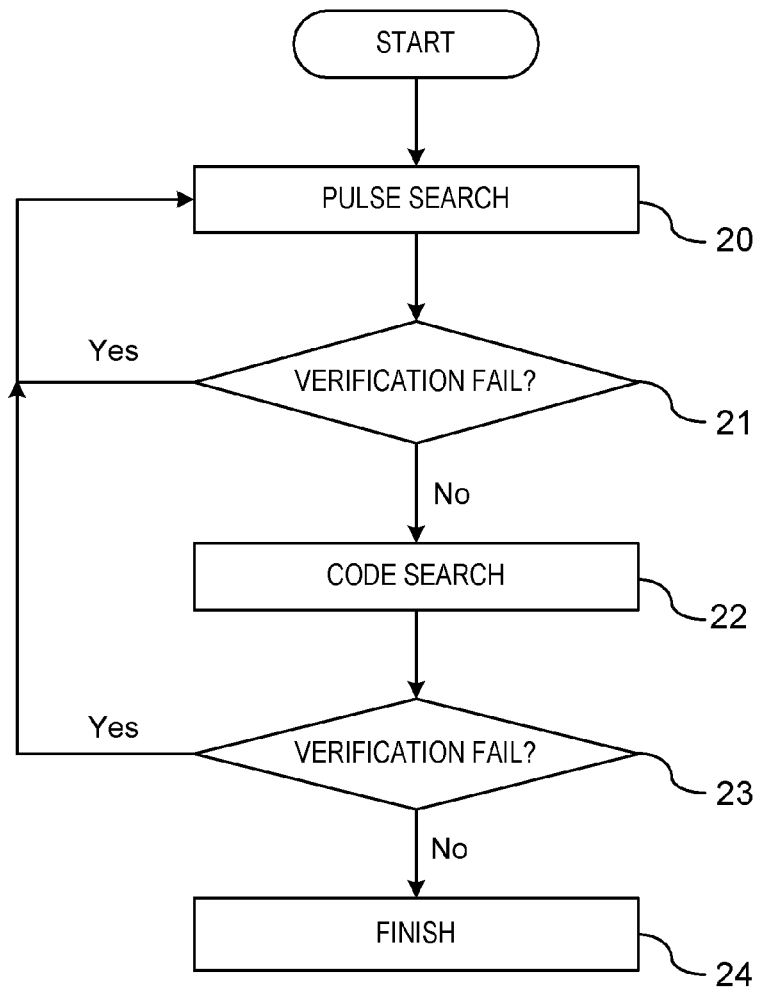
FIG. 4 is a flowchart of a method for detecting the delay and phase of a received signal.

FIG. 4 illustrates a high level block diagram for the rapid acquisition technique. In step 20, the delay search is executed first. The delay search takes the time of several frames to complete depending on the search resolution.

Once the delay search is completed, a verification process is executed in step 21. If the verification process fails, then a return is made to step 20 to re-initiate the pulse search. If the verification process passes, then the routine proceeds to step 22.

In step 22, the code search is initiated. Once the code search is completed, a verification process is executed in step 23. If the verification process fails, then a return is made to step 20 to re-initiate the pulse search. If the verification process of step 23 passes, then the acquisition process terminates in step 24 and the data processing is performed on the signal having the correct phase.

Figure 5:
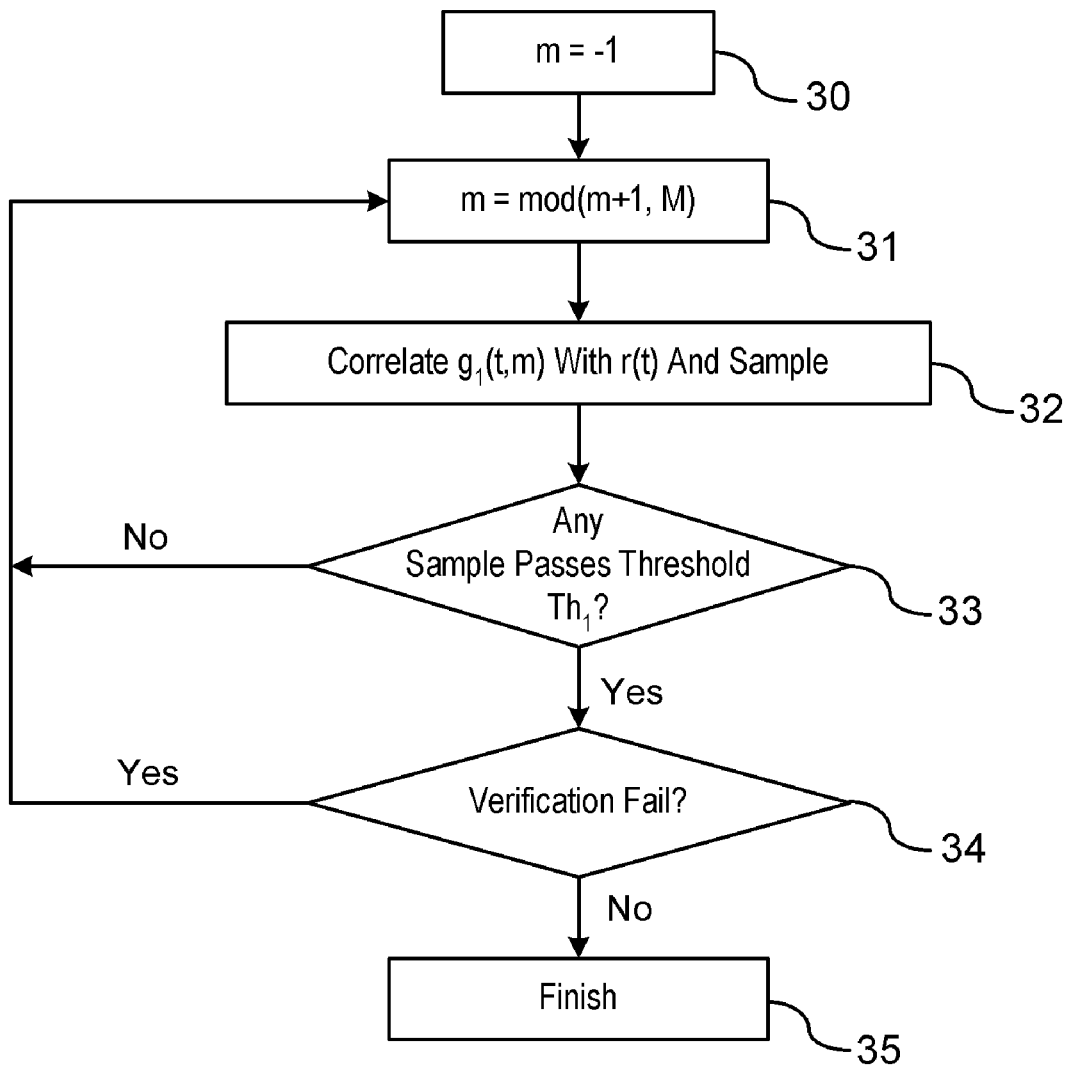
FIG. 5 is a flowchart of a method for the delay search.

FIG. 5 is a flowchart of a method for the delay search. In step 30, the index 111 for which the delay is incremented is initially set to −1. In step 31, the index 111 is recalculated for determining the amount of delay that the signal template should be incremented during the delay search. The index 111 is determined by the following equation:

$$m = \mathrm{mod}(m+1, M)$$

where m is the index, M is a predetermined integer, and $\mathrm{mod}(m+1,M)$ is the remainder of $$\left(\frac{m+1}{M}\right).$$

In step 32, the signal r(t) is correlated with the signal template g(t,m) and sampled. In step 33, a determination is made whether any of the samples have an absolute energy level greater than a threshold $Th_1$. If no sample passes the threshold $Th_1$, then a return is made to step 31 to determine the increase in the delay for the signal template for sampling a next set of chips. If a sample has an absolute energy level greater than the threshold $Th_1$, the routine advances to step 34.

In step 34, a verification process is applied to the signal. If the verification fails, a return is made to step 31. If the verification passes, then the routine completes the delay search in step 35.

Figure 6A:
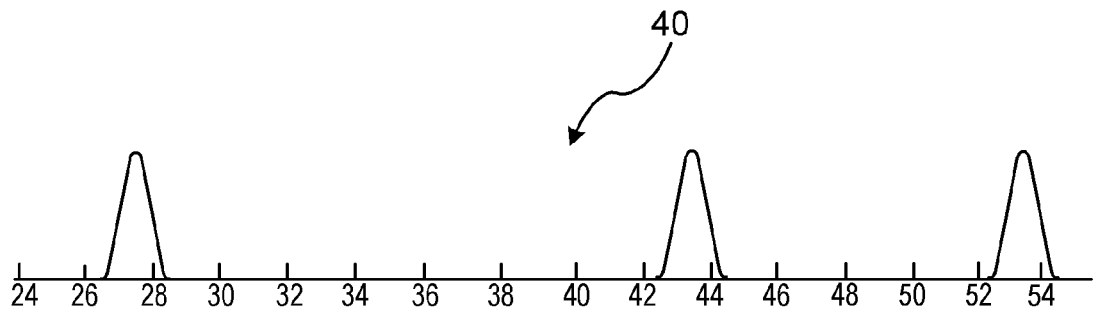
FIG. 6a is the example of the transmitted UWB signal.
Figure 6B:
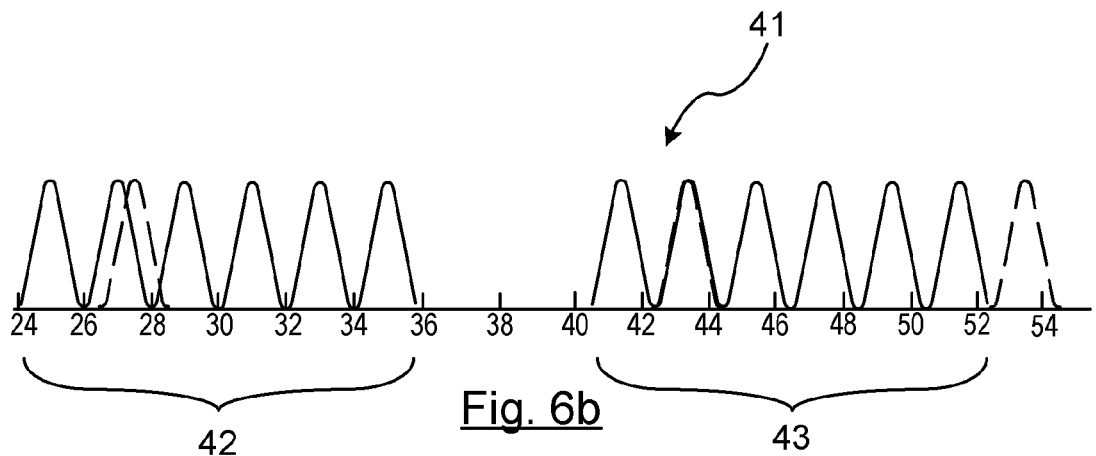
FIG. 6b illustrates the correlation of the signal template and received signal.
Figure 6C:
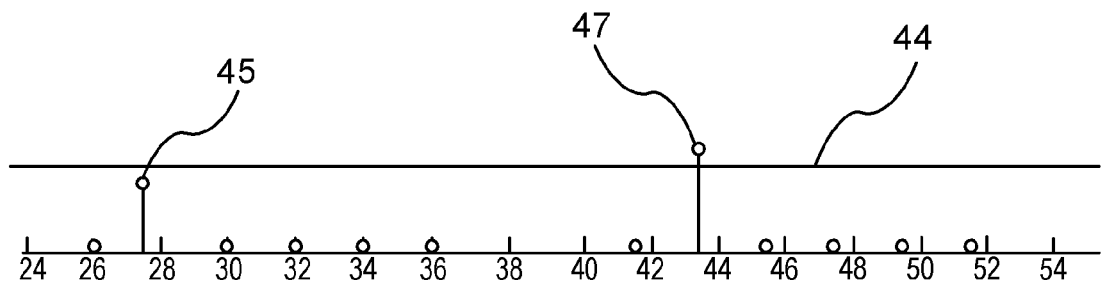
FIG. 6c illustrates of absolute energy chart for the correlated signal.

FIGS. 6a-c represents timeline illustrations which will be used to graphically explain the delay search process. FIG. 6a represents the transmitted signal received by a receiver. FIG. 6b represents a signal template 41 that is correlated with the received signal. The signal template includes a pulse train of $N_f$ pulses. The signal template is represented by the equation:

$$g(t, m) = \sum_{i=1}^{N_f} p(t - iT_c - m\Delta\tau), m = 0, \ldots, M-1$$

FIG. 6b illustrates the signal template g(t,m) 41 used to correlate with the received signal 40. The correlation result is sampled every $T_c$ time unit. As a result, there are $N_f$ samples for each signal template. Each pulse in the signal template 41 is equal in amplitude and duration to a pulse in the received signal 40. The signal template 41 is correlated with received signal 40 for identifying an exact position of a pulse within the preamble of the received signal 40. To perform the correlation, the signal template 41 is positioned over a respective frame along a respective set of chip positions as shown at 42 and 43 in FIG. 6b. Each pulse within the signal template 41 is compared to overlaying chip positions. If a respective pulse within the signal template 41 overlaps a pulse in the received signal, then the absolute energy level is recorded. The absolute energy level is the magnitude of the point of overlap (i.e., point of intersection) between the corresponding pulse of the signal template and the corresponding pulse in the received signal 40. The absolute energy level is then recorded and compared to the threshold $Th_1$.

FIG. 6c illustrates a chart for determining whether an absolute energy value for a pulse satisfies a predetermined threshold. The threshold $Th_1$ is represented by 44. To determine that a match is present, the absolute energy value for a respective set of overlapping pulses between the signal template and the received signal must be greater than the threshold $Th_1$ 44. Maximum correlation occurs when the delay of the template matches the delay of the channel so that the transmitter and receiver are synchronized. Referring to both FIGS. 6b and 6c, a first set of chip positions 42 is correlated with the signal template 41. An overlapping set up pulses between the received signal and the signal template is identified. The absolute energy level is recorded for the respective overlap. If the absolute energy value for the overlapping pulses is not greater than the threshold $Th_1$, as indicated at 45, then maximum correlation for the delay search is not achieved and the next search is conducted over the next set of chip positions 43. The next set of chip positions 43 for the received signal is correlated with the signal template and sampled. As shown in FIG. 6b, an overlap 47 exists with respect to a pulse of the received signal 40 and the signal template 41. The absolute energy level is recorded for the overlap 47 between the two pulses. If the absolute energy level is above the threshold $Th_1$ 44, then the determination is made that a match is present and the delay search is tentatively completed. The location of the position of the exact match within a chip position is referred to as a chip boundary. For all pulses within the signal, each of the pulses will be located at the determined chip boundary within a respective chip position of a respective frame. Given the exact location of the pulse within a respective chip position if present, only the correct phase is needed for synchronization.

The delay search is verified before exiting the delay search and proceeding to the code search. Verification of the delay search follows a same procedure as the search process for a given m (i.e., finding the maximum sample among all $N_f$ samples and comparing it with the threshold $Th_1$. The process verifies that only if the pulses in the signal template are properly aligned with those in the received signal can the correlation performed in the code search have a large enough value to properly detect the correct phase. After verification of the delay search results is complete, the routine then determines the correct phase. It should be noted that in the delay search, due to time-hopping of the pulses, there may be a possibility that no pulse is detected during a correlation attempt. In such an instance when no pulse is detected, then the delay of the template is not increased in a next sampling.

Figure 7:
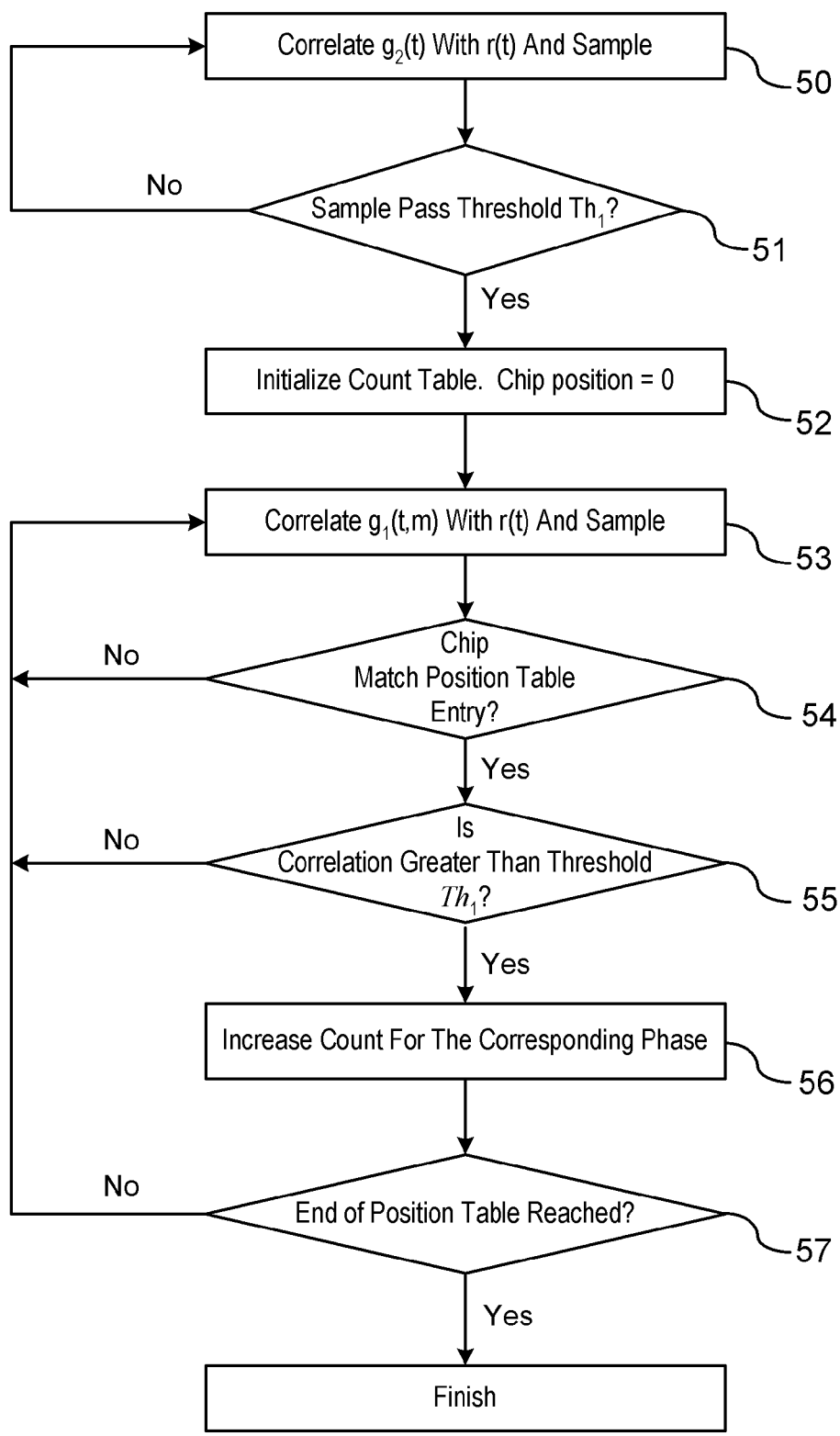
FIG. 7 is a flowchart for a method for the code search.

FIG. 7 illustrates a flow chart for executing the code search (i.e., finding the correct phase). The signal template $g_2(t)$ for the code search technique includes only a single transmitted pulse. In step 50, the received signal $r(\tau)$ is correlated with the single pulse template signal $g_2(t)$ and sampled at each chip position. The purpose is to detect a first pulse in the received signal so that the code search may have a starting point for executing the code search.

In step 51, a determination is made whether the sample passes the threshold $Th_1$. If the sample does not pass the threshold check, then a return is made to step 50 to sample a next chip position. This is repetitively executed until a first pulse is detected that satisfies the threshold $Th_1$. If a pulse is detected that satisfies the threshold $Th_1$, then the routine proceeds to step 52

In step 52, the count table is initialized by setting the chip position of the pulse detected, in step 51, to 0. The routine proceeds to step 53.

In step 53, the received signal r(t) is correlated with the single pulse template signal $g_2(t)$ and sampled at each chip position starting at chip position 1 (i.e., the chip position following the initialized chip position 0 as determined in step 52).

In step 54, a determination is made whether the chip position matches a pulse entry in the table. If the chip position does not match the table entry, then a return is made to step 53 to check a next chip position. If a determination is made that the chip position does match pulse entry in the table, then the routine proceeds to step 55.

In step 55, a determination is made whether sample at the chip position analyzed in step 54 is greater than the threshold $Th_1$. If the sample exceeds the threshold, then the routine proceeds to step 56, otherwise a return is made to step 53 to continue sampling.

In step 56, a count for the corresponding phase is increased by 1. A determination is made in step 57 when the end of the position table has been reached. If the end of the position table has not been reached, then a return is made to step 53. If the end of the position table has been reached, then routine is completed. It should be understood that each phase is checked for determining which phase has a maximum count value.

FIG. 8a-c illustrates a diagrammatic illustration of the code search described herein. Table 8a represents the possible phases in which UWB signal may be transmitted. Recall that the delay search has provided a fine tune position that a pulse will be located within a chip position if a pulse is present; however, the correct phase at which the signal is transmitted must be determined.

For exemplary purposes, it is determined that each frame of the signal has 4 chip positions which can contain a pulse ($N_c$=4). The length of a frame is equal to 6 chip positions ($N_f$=6). The time-hopping sequence of the transmitted signal is [4, 1, 3, 2]. This data is predetermined and know by the receiver.

Each of the phases is evaluated and the chip positions of the sequence for each phase are identified. In Table 8a, the starting position of a bit for each phase is illustrated by a cross-hatched block. For example, for phase 1, the starting position for the bit is identified at cross-hatched chip position 1. Phase 2 is shifted in phase by 1 chip position. Therefore, the starting position of the bit is identified at cross-hatched chip position 2. The sequence continues for the remaining phases 3-24 where the starting position for each incremented phase is shifted by one chip position.

After the starting positions for each phase are identified, the chip position for the sequence in each frame is identified. That is, starting with phase 1, the chip position for the first frame is identified as set forth by the time hopping sequence of the transmitted signal [4, 1, 3, 2]. As shown in FIG. 8a, for the $1^{St}$ frame of phase 1, the chip position corresponding to 4 within the frame is identified (e.g., chip position 4), for the $2^{nd}$ frame of phase 1, the chip corresponding to chip position 1 within the frame is identified (e.g., chip position 7), for the $3^{rd}$ frame, the chip corresponding to chip position 3 within the frame is identified (e.g., chip position 15), and for the $4^{th}$ frame, the chip position corresponding chip position 2 within the frame is identified (e.g., chip position 20). This procedure is performed for all the phases. Each of the respective chip positions are identified by the bolded squares in FIG. 8a.

To make a rapid determination as to which phases may be candidate phases, the code search is initiated after the first pulse is located. For example, if a first pulse is detected at chip position 4, then all phases having a pulse located at chip position 4 are identified. In the example shown in FIG. 8a, phases 1, 9, 14, and 22 are identified as phases having a pulse located at chip position 4. For simplicity purposes, the phases 1, 9, 14, and 22 are shown in FIG. 8b.

In FIG. 8b, the chips positions are renumbered starting with the chip position starting directly after the first pulse is found. In this example, former chip position 5 is initialized as the first chip position. As a result, the chip positions are renumbered started with previous chip position 5 as chip position 1 and then sequentially incremented as shown in table of FIG. 8b. This new timeline is termed a code search time.

To fill in the table in FIG. 8c, each pulse in each respective phase (shown FIG. 8b) is identified. More than one phase may be identified for a respective chip position since it is possible to have a pulse in both phases located at a same chip position. The table in FIG. 8c is completed by identifying each phase and recording its associated chip position that includes.

After the table is completed, the entries are compared with the chip position of the received signal. The phase having the maximum number of chip positions that correlate to the received input signal is considered to be the correct phase. For example, if pulses in the received signal are found to be at chip positions 3, 11, and 16, then it is determined from FIG. 8c that phase 1 has 3 counts (e.g., one count for each pulse located at each chip position of received signal), phase 9 has 1 count (e.g., only one pulse at chip position 11), phase 14 has 1 count (e.g., only one pulse at chip position 16), and phase 22 has 0 counts. As a result, phase 1 has the maximum count and is considered the correct phase.

The verification stage is executed after the code searching stage to reduce the probability of false alarms. The template utilized for the code searching verification is the same as the transmitted signal. The correlation is no longer sampled at every $T_c$. Instead, search template is integrated over the period of $N_{th}T_f$ which is the length of time which will take to conduct the code search. This length can be shortened; however, only at the expense of an increase in false alarms. If the verification passes a code search threshold $Th_2$, then the acquisition process finishes. If the verification result fails, then a return can be made to the delay search or the code search. Preferably, a return is made to the delay search.

It should be understood that the length of time for the code search $N_{th}T_f$ can be more than half the time of the entire search. Therefore, it would be desirable to detect false alarms as early as possible. A quick check may be executed after at least a predetermined number of chips positions $N_{FA}$ have been counted for each phase. A determination can be made whether the count for each candidate phase at a respective point in time passes a threshold count. For example, we request that the count should be larger or equal to 2 after at least three positions have been counted. In the example shown in FIG. 8c, the count for early false alarm detection should be carried out to chip position 13. To get a meaningful check, the predetermined number of chip positions $N_{FA}$ should be at least 5 positions. It is noted that this check is more useful for long time-hopping sequences in contrast to short time-hopping sequences.

The advantage of the rapid acquisition method described herein is that at the receiver side only a single correlator is required to search the phase of the received signal thereby maintaining low complexity as is typically used in serial search techniques. However, by sampling the correlation of the received signal with one pulse at each chip period, many phases can be searched simultaneously utilizing only the single correlator. The acquisition time is thereby comparable to that of parallel search techniques while utilizing only the single correlator. This rapid acquisitions method described herein removes the restriction that the channel delay has to be a multiple of the chip interval and the delay can be searched to any given resolution. By searching the delay first (e.g., fine tuning search), the chip boundaries of the received signal are located, thereby only requiring that the code search identify the correct phase of the time-hopping sequence. The embodiments described herein do not reduce the effective spreading length which would otherwise reduce the robustness leading to false alarms even at high signal to noise ratios.

It should be understood that although the embodiment described herein describes an exemplary use in an intra-vehicle sensor communication system, the invention may be applicable to any time-hopping impulse UWB communication system.

While certain embodiments of the present invention have been described in detail, those familiar with the art to which this invention relates will recognize various alternative designs and embodiments for practicing the invention as defined by the following claims.

What is claimed is:

1. A method of determining a delay and phase of a received ultra-wide band signal in an impulse ultra-wideband communication system, the method comprising the steps of:
    (a) receiving an ultra-wideband (UWB) signal from a transmitting device;
    (b) comparing a signal template to at least one frame in a preamble of the received UWB signal, the signal template including a series of continuous pulses wherein each pulse is equivalent to an amplitude and duration of a pulse in the preamble of the USB signal, wherein the preamble is sampled at various time positions using the signal template until a pulse in the signal template matches a pulse in the preamble;
    (c) identifying a chip boundary within a chip position at which the pulse is detected;
    (d) providing a plurality of phases having a time-hopping sequence of the UWB signal, wherein each of the pulses in the plurality of phases are positioned within respective chip positions at the chip boundary as determined in step (c);
    (e) identifying a chip position of a first pulse in the received signal;
    (f) identifying the phases that have a pulse at the chip position identified in step (e); and
    (g) comparing the phases identified in step (f) with the UWB signal, wherein the comparison between each phase and the UWB signal is initiated at a next chip position following the chip position identified in step (e), wherein a chip position for each pulse of each phase is recorded and compared to the pulse chip positions of the UWB signal, wherein the phase having a maximum number of pulse chip positions that directly correlate to the pulse chip positions of the UWB signal is selected for synchronization to process the remainder of the UWB signal.

2. The method of claim 1 wherein a verification process is performed after identifying the pulse chip position in step (e), wherein a return is made to step (b) if the verification process fails, the verification process verifying that an absolute energy level of a correlated pulse is above a predetermined threshold.

3. The method of claim 2 wherein a second verification process is performed after identifying the phase in step (f), wherein a return is made to step (b) if the second verification process fails, wherein the second verification determines whether each of the pulses identified in a bit for a respective phase is above the predetermined threshold.

4. The method of claim 2 wherein the verification process checks the correlation between the received signal the signal template, the signal template being represented by the following formula:

$$g(t, m) = \sum_{i=1}^{N_f} p(t - iT_c - m\Delta\tau), m = 0, \ldots, M - 1$$

where p(t) is the pulse function, $N_f$ which is the number of chips within a frame, $T_c$ is the chip duration, $\Delta\tau$ is the search resolution, m is the time index for incrementing the delay, M is a predetermined constant.

5. The method of claim 1 wherein a chip position table is generated for recording the pulses found at respective chips positions for each phase.

6. The method of claim 1 wherein the step of determining a match between a pulse in the preamble and a respective pulse of the signal template comprises the steps of:
    determining whether a pulse in the signal template overlaps a pulse in the preamble;
    determining an absolute energy level value for an overlap point between the pulse in the signal template and the pulse in the preamble;
    comparing the absolute energy level value to a predetermined threshold; and
    determining that a match is present in response to the absolute energy level value being greater than the predetermine threshold.

7. The method of claim 6 wherein the signal template is compared to a next set of chip positions in response to the absolute energy level value being less than the predetermined threshold, otherwise proceeding to step (c).

8. The method of claim 7 wherein if a pulse having an absolute energy level value less than the predetermined threshold and greater than zero is detected; then a delay of the signal template is increased in a next sampling of the chip positions, the delay being a time period which is allowed to lapse before sampling a next set of chip position.

9. The method of claim 8 wherein the delay is a fraction of a single chip duration.

10. The method of claim 7 wherein if a pulse is not detected in a current sampling, then a delay of the signal template is not increased in a next sampling of the chip positions.

11. The method of claim 1 wherein the phase of the UWB signal is detected using a single correlator.

12. A method of acquiring an ultra-wide band signal in an impulse ultra-wideband communication system, the method comprising the steps of:
(a) receiving an ultra-wideband (UWB) signal from a transmitting device;
(b) executing a pulse search that includes correlating a signal template with the UWB signal and sampling a preamble of the UWB signal at various time positions until a pulse in the signal template matches a pulse in the preamble;
(c) identifying a chip boundary at which the pulse in the preamble is detected using the signal template during the pulse search;
(d) initiating a code search for identifying a phase of a time-hopping sequence of the UWB signal, the code search providing a plurality of phases having a same time-hopping sequence as the UWB signal, each of the plurality of phases having initial starting positions that are different than one another, wherein each of the pulses in the plurality of phases are positioned within respective chip positions at the chip boundary as determined in step (c);
(e) identifying a chip position of a first pulse in the received signal detected after the initiation of the code search;
(f) identifying the phases having a pulse at the chip position identified in step (e); and
(g) comparing the phases identified in step (f) with the UWB signal for determining a phase match, wherein the comparison between each phase and the UWB signal is initiated at a next chip position that follows the chip position identified in step (f), wherein the phase that matches the UWB signal is selected for synchronization for processing the remainder of the UWB signal.

13. The method of claim 12 wherein executing the pulse search includes comparing a signal template to at least one frame in a preamble of the received UWB signal, the signal template including a series of continuous pulses wherein each pulse is equivalent to an amplitude and duration of a pulse in the preamble of the USB signal, wherein the preamble is sampled at various time positions using the signal template until a pulse in the signal template matches a pulse in the preamble.

14. The method of claim 13 wherein determining whether a pulse in the signal template matches a pulse in the preamble further comprises the steps of:
determining whether a pulse in the signal template overlaps a pulse in the preamble;
determining an absolute energy level value for a maximum overlap point between the pulse in the signal template and the pulse in the preamble;
comparing the absolute energy level value to a predetermined threshold; and
determining that a match is present in response to the absolute energy level value being greater than the predetermine threshold.

15. The method of claim 14 wherein the signal template is compared to a next set of chip positions in response to the absolute energy level value being less than the predetermined threshold, otherwise proceeding to step (d).

16. The method of claim 15 wherein if a pulse having an absolute energy level value is less than the predetermined threshold is detected, then a time delay is increased for initiating a next sampling of the chip positions.

17. The method of claim 16 wherein if a pulse is not detected in a current sampling, then a current time delay is maintained for initiating a next sampling of the chip positions.

18. The method of claim 12 wherein comparing the phases identified in step (f) with the UWB signal includes recording a chip position for each pulse of each phase, wherein each chip position of each recorded phase is compared to the pulse chip positions of the UWB signal, and wherein a phase having a maximum number of pulse chip positions that directly correlate to the pulse chip positions of the UWB signal is selected for synchronization for processing the remainder of the UWB signal.

19. The method of claim 18 wherein a chip position table is generated for recording the pulses found at respective chip positions of each phase to identify the phase having the maximum number of pulse chip positions directly correlating to the pulse chip positions of the UWB signal.

20. The method of claim 12 wherein the phase of the UWB signal is detected using a single correlator.

* * * * *